United States Patent [19]

Wehnelt

[11] 4,414,722
[45] Nov. 15, 1983

[54] METHOD FOR THE MANUFACTURE OF ELECTRICAL COMPONENTS ESPECIALLY LAYER CAPACITORS

[75] Inventor: Ulrich Wehnelt, Söcking, Fed. Rep. of Germany

[73] Assignee: Siemens Aktiengesellschaft, Berlin and Munich, Fed. Rep. of Germany

[21] Appl. No.: 270,223

[22] Filed: Jun. 4, 1981

[30] Foreign Application Priority Data

Jun. 10, 1980 [DE] Fed. Rep. of Germany ....... 3021786

[51] Int. Cl.³ .............................................. H01G 4/32
[52] U.S. Cl. .................................... 29/25.42; 29/621; 29/854; 427/79; 427/284; 427/290; 427/300
[58] Field of Search ............... 29/25.42, 621, 854–856; 427/79–81, 284, 285, 290, 300

[56] References Cited

U.S. PATENT DOCUMENTS 1,781,877 11/1930 Levin ............................. 427/300 X
3,252,830 5/1966 Cummin et al. .
3,330,696 7/1967 Ullery et al. .
3,360,398 12/1967 Garibotti ......................... 427/79 X Primary Examiner—Carl E. Hall
Attorney, Agent, or Firm—Herbert L. Lerner; Laurence A. Greenberg

[57] ABSTRACT

Manufacture of electrical components, particularly layer capacitors with dielectric layers of glow polymerisate, in which strip-shaped carriers are separated from an insulating tape. First, contact layers of a metal which does not soften during later contacting are applied to two opposite sides. Thereupon a metal layer and, optionally, further layers are applied to at least one side which is still free of metal. The metal layer is applied so that it overlaps at least one of the contact layers and forms with the latter an electrically conducting connection. The method is characterized by the features that the carriers are separated from an unmetallized insulating tape; that the cutting surfaces of the carriers are coated with the contact layers; and that then the metallization of the components is applied to one of the smooth surfaces which have not yet been metallized.

2 Claims, 3 Drawing Figures

METHOD FOR THE MANUFACTURE OF ELECTRICAL COMPONENTS ESPECIALLY LAYER CAPACITORS

BACKGROUND OF THE INVENTION

1. Field of the Invention

The present invention relates to a method for the manufacture of electrical components, especially film capacitors with dielectric layers of glow polymerisate, in which strip-shaped carriers are separated from insulating tape. First, contact layers of a metal which does not soften when contacts are applied later, are applied to two opposite sides of the carrier. Subsequently, a metal layer and, optionally, further layers are applied to at least one still metal-free side. The metal layer is applied so that it overlaps at least one of the contact layers and forms with the latter an electrically conducting connection.

2. Description of the Prior Art

A method has been proposed in which an insulating material is first provided with metal layers and then cut into strip-shaped carriers. The metal layer of the component is applied to the cut surface.

SUMMARY OF THE INVENTION

An object of the present invention is to provide a method for the manufacture of electrical components of the type described in which there is an improvement of the adhesion of the contact layers and an improvement of the electrically conducting connection between the metallization and the contact layers.

With the foregoing and other objects in view, there is provided in accordance with the invention a method for the manufacture of electrical components, especially layer capacitors with dielectric layers of glow polymerisate, which comprises separating strip-shaped carriers with smooth surfaces from an unmetallized electrically insulating tape, coating the two opposite surfaces of the carrier resulting from said separation from the tape by applying contact layers of a metal which will not soften during later contacting of the metal, and subsequently metallizing a smooth unmetallized surface of the carrier by applying a metal layer thereto which overlaps at least one of the contact layers and forms with the latter an electrically conducting connection.

Other features which are considered as characteristic for the invention are set forth in the appended claims.

Although the invention is illustrated and described herein as embodied in a method for the manufacture of electrical components especially layer capacitors, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings in which.

DETAILED DESCRIPTION OF THE INVENTION

Figure 1:
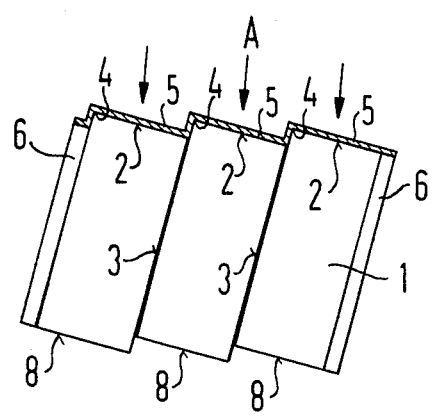
FIG. 1 diagrammatically illustrates three strip-shaped carriers sawed off from unmetallized insulating tape are placed against each other in offset manner to expose their separating surface to the application of a contact layer of metal as shown by arrow A.

In accordance with the invention, the carriers are cut off from an unmetallized insulating tape. The separating surfaces of the carrier are coated with the contact layer. Then metallizations of the components are applied to the smooth surfaces which have not yet been metallized.

By virtue of this method, the adhesion of the contact layer is improved, because the latter are applied to the relatively rough cutting surfaces. In addition, the electrically conducting connection between the metallization and the contact layers is improved and made more secure. For, as far as we can see, a rough surface of the carrier has the effect of inducing tearing at the metallization in the area of the contacts. A smooth surface, on the other hand, causes no tearing of the metallization. Good adhesion of the contact layers also prevents the contact layers from separating from the carrier when contacts are soldered on.

Tapes of plastic are advantageously used as the insulating tape. The plastic may also be fiberglass-reinforced. In particular, epoxy resins and teflon are suitable as materials for the insulating tape. Instead of plastic tapes, plastic sheets can also be used. If the plastic tapes or plastic sheets do not have a sufficiently smooth surface, the surface can be smoothed. This is readily accomplished, for instance, by varnishing the surface.

The invention is advantageously suited for small components which have a contact spacing, for instance, of 2.5 mm ("Chips" and "Caps"). The insulating tape is convenietly cut by sawing or milling. The contact layers consist advantageously of a relatively high-melting solderable metal, for instance, copper. The metal layers can be made by sputtering, vapor deposition or by electroless deposition. Due to its relatively high melting point, the metal of the contact layers makes possible the soldering-on of leads without softening.

In one embodiment of the invention, the insulating tape is sawed apart to form a plurality of strip-shaped carriers. Several carriers are placed against each other in such manner that the separating surfaces formed by the sawing are exposed. The exposed separating surfaces are provided with contact layers and the carriers are subsequently separated from each other. Thus, a larger number of carriers can, simultaneously, be provided with the contact layers. Each contact layer selected can be very thin, for instance between 0.05 $\mu$m and 2 $\mu$m, since only solderability has to be ensured. It is therefore possible without difficulty to separate the carriers from each other after the contact layers are applied without the development of objectionable tearing edges of the contact layers.

Advantageously, the carriers are provided with contact layers offset relative to each other perpendicularly to the separating surfaces. The contact layers are here drawn around the exposed edges of the carriers.

This provides a practically continuous transistion between the contact layers and the metal coating of the component. The latter is thereby subjected to little mechanical stress, especially if solder-contacting is applied later.

A particularly advantageous embodiment of the coating is obtained if one edge of each separating surface is bevelled or rounded. Thus, the metallization of the component can be applied overlapping this inclined surface, or on the contact layer which is brought around the unbroken edge. The contact layer as well as the metallization can be deposited by a simple sputtering or vapor deposition process. The carriers can also be passed through the vapor source in flat condition. It is, thereby, possible to use customary metallization facilities. In addition, a contact layer can be applied in this embodiment simultaneously and without restacking, to each of the two separating surfaces of the carriers.

A further advantage of the beveled, and particularly of the rounded edge of the separating surface, is obtained if the contact layer is applied by sputtering. In sputtering, the metal atoms are deposited on the carrier without a clearly preferred orientation, so that coating is possible around a right-angle corner. If the carriers are stacked-up with the two processed edges for the metallization, a gap is created, through which a very gradually tapering metal layer is developed on this unbeveled surface. Thus, the metallization for the component can be made later on this surface without impediment and without an edge in the transition region.

If relatively thick contact layers are made, it is advantageous, before the carriers are separated, to cut the contact layers off on the surface of the carrier, on which the metallization of the component is to be applied. Thereby, smooth boundaries and transitions from the contact layer to the metallization are also obtained.

For the manufacture of capacitors, metallization which overlap the one or other contact layer and are separated from each other by insulating layers, are applied alternatingly to the carriers. Slow polymerisate layers are particularly suited as insulating layers since they can be made quite thin and therefore result in a high capacity per unit volume. Several capacitors can be placed on a carrier simultaneously by separating the metallization of adjacent capacitors through metal-free strips and dividing the carriers in the vicinity of these strips after the capacitors are finished. In the manufacture of resistors, the metallization can overlap both contact layers of a carrier. In that case, the metallization is advantageously shaped in meander form, the straight parts of which are parallel to the contact layers. Also resistance networks or R-C (resistance-capacitance) networks can be prepared in accordance with the method of the invention.

The invention will now be explained in greater detail with the aid of the drawings.

The drawings show strip-shaped carriers 1, which are sawed-off from an insulating tape and are placed against each other in such a way that their separating surfaces 2, i.e. the surfaces formed by separating the carriers from the tape, are accessible for the application of a contact layer.

Figure 2:
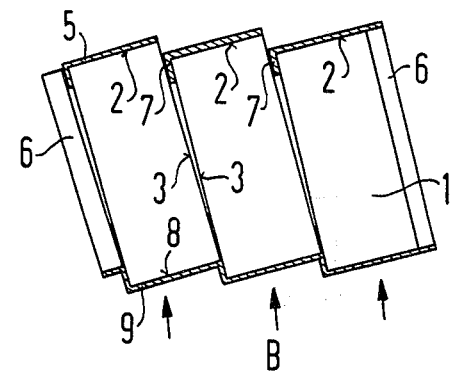
FIG. 2 is similar to FIG. 1 with respect to offset arrangement of the carriers and with application of the contact layer to the opposite separating surfaces as indicated by arrow B. In addition, the carriers form an acute angle to expose part of the smooth surface of the carrier which is also coated with the contact layer.

The smooth surfaces 3 of the components lie on top of each other. A contact layer of metal 5 is applied in the direction of the arrow A, and extends, as seen in FIGS. 1 and 2, around the edges 4 of the carriers 1. In order to make this possible, the carriers 1 are displaced against each other in the direction perpendicular to their sawcut surfaces 2. The displacement of the carriers 1 forms a small acute angle, so that the exposed parts of the smooth surface 3 are covered by the coating. For coating, sputtering or vapor deposition of metal is preferably employed here. The contact layer 5 generated thereby can be relatively thin. If copper is used for making the contact layer, a thickness between 0.05 μm and 2 μm is sufficient. Coverings 6 prevent the simultaneous coating of the unprotected outer surfaces of the carriers 1. After the contact layers 5 are applied, a contact layer 9 is placed on the opposite side. As a rule, this contact layer 9 must be brought from the respective separating surfaces 8 to the same surface 3 of the carrier 1 as the contact layer 5.

In order to achieve this, the carriers 1 are separated from each other after the contact layer 5 is applied and are displaced relative to each other in the opposite direction, perpendicularly to the separating surfaces 2. To this end, the contact layer 5 is advantageously cut through on the surface 3 of the carriers 1. The edges 7 of the contact layer obtained in this manner then come to lie between two surfaces 3 of the carriers 1. Then, the contact layer 9, which corresponds to the contact layer 5, is applied in the direction of the arrow B on the separating surfaces 8 which are not yet metallized. After separating the individual carriers 1, the sides, on which the edges 7 of the contact layers 5 and 9, respectively, lie, are provided with metallization of the component and, optionally, with further layers.

Figure 3:
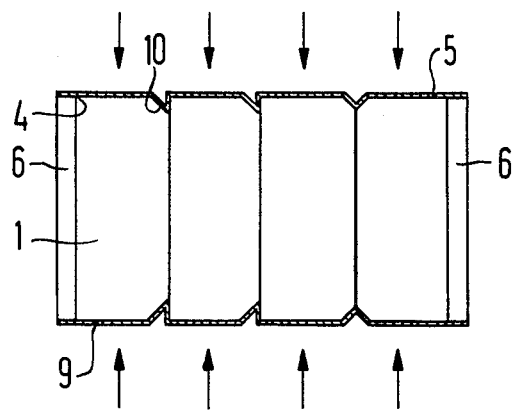
FIG. 3 shows an arrangement of carriers with beveled edges.

FIG. 3 shows carriers 1 with beveled edges 10, which may be opposite either an unbeveled edge 4 or a beveled edge 10 of the adjacent carrier 1. This arrangement can be metallized simultaneously from both sides. After separation into individual carriers 1, the surface 3 of the carrier which is bounded by the beveled edges 10 is then provided with the metallization, not shown, and optionally, with the remaining layers of the component. This embodiment of the method allows particularly efficient mass production.

There is claimed:

1. Method for the manufacture of layer capacitors with dielectric layers of glow polymerisate, which comprises sawing apart an unmetallized electrically insulating tape having smooth surfaces to form a plurality of separate strip-shaped carriers with smooth surfaces and relatively rough separating surfaces formed by the sawing operation, placing a plurality of the carriers against each other in such manner that their separating surfaces formed by the sawing are exposed, offsetting the carriers relative to each other perpendicularly to the separating surfaces to expose edges of the smooth surfaces of the carriers maintaining the plurality of carriers in the positions achieved by said placing and offsetting operations, while said plurality of carriers are so maintained, coating the two opposite surfaces of the carriers resulting from said separation from the tape and also the exposed edges of the carriers by applying contact layers of a metal which will not soften during later contacting of the metal, and subsequently metallizing a smooth unmetallized surface of each carrier by applying a metal layer thereto which overlaps at least one of the contact layers and forms with the latter an electrically conducting connection.

2. Method for the manufacture of layer capacitors with dielectric layers of glow polymerisate, which comprises sawing apart an unmetallized electrically insulating tape having smooth surfaces to form a plurality of separate strip-shaped carriers with smooth surfaces and relatively rough separating surfaces formed by the sawing operation, placing a plurality of the carriers against each other in such manner that their separating surfaces formed by the sawing are exposed, exposing at least one edge of each smooth surface by a bevelling or rounding operation, maintaining the plurality of carriers in the position achieved by said placing operation, while said carriers are so maintained coating the two opposite surfaces of the carriers resulting from said separation from the tape and also the exposed edges of the smooth surfaces of the carriers by applying contact layers of a metal which will not soften during later contacting of the metal, and subsequently metallizing a smooth unmetallized surface of each carrier by applying a metal layer thereto which overlaps at least one of the contact layers and forms with the latter an electrically conducting connection.

* * * * *